United States Patent
Guan et al.

(10) Patent No.: US 8,625,234 B2
(45) Date of Patent: Jan. 7, 2014

(54) GRADED BEVEL TAPERED WRITE POLE DESIGN FOR FIELD ENHANCEMENT

(75) Inventors: Lijie Guan, San Jose, CA (US); Po-Kang Wang, Los Altos, CA (US); Moris Dovek, San Jose, CA (US); Joe Smyth, Aptos, CA (US); Kenichi Takano, Cupertino, CA (US); Yoshitaka Sasaki, Santa Clara, CA (US)

(73) Assignee: Headway Technologies, Inc., Milpitas, CA (US)

( * ) Notice: Subject to any disclaimer, the term of this patent is extended or adjusted under 35 U.S.C. 154(b) by 1092 days.

(21) Appl. No.: 12/150,553

(22) Filed: Apr. 29, 2008

(65) Prior Publication Data
US 2009/0268344 A1 Oct. 29, 2009

(51) Int. Cl.
*G11B 5/31* (2006.01)

(52) U.S. Cl.
USPC ............ 360/125.13; 360/125.12; 360/125.15; 360/119.04; 360/122

(58) Field of Classification Search
USPC .................. 360/119.02, 119.04, 122, 125.09, 360/125.13, 125.19
See application file for complete search history.

(56) References Cited

U.S. PATENT DOCUMENTS

| | | | | |
|---|---|---|---|---|
| 4,926,276 A | * | 5/1990 | Orikasa et al. | 360/122 |
| 4,947,541 A | * | 8/1990 | Toyoda et al. | 360/125.64 |
| 4,970,616 A | * | 11/1990 | Ramaswamy | 360/122 |
| 6,477,006 B1 | * | 11/2002 | Sato | 360/125.43 |
| 6,621,659 B1 | | 9/2003 | Shukh et al. | |
| 6,680,815 B2 | | 1/2004 | Sasaki | |
| 7,116,517 B1 | | 10/2006 | He et al. | |
| 7,133,253 B1 | | 11/2006 | Seagle et al. | |
| 7,151,647 B2 | | 12/2006 | Sasaki et al. | |
| 7,193,815 B1 | | 3/2007 | Stoev et al. | |
| 2002/0080522 A1 | * | 6/2002 | Sato et al. | 360/126 |
| 2005/0219743 A1 | * | 10/2005 | Guan et al. | 360/125.19 |
| 2006/0044677 A1 | | 3/2006 | Li et al. | |
| 2008/0316653 A1 | * | 12/2008 | Sasaki et al. | 360/319 |
| 2009/0059426 A1 | * | 3/2009 | Sasaki et al. | 360/125.02 |
| 2009/0116145 A1 | * | 5/2009 | Guan et al. | 360/125.02 |

OTHER PUBLICATIONS

Co-pending US Patent HT07-005, U.S. Appl. No. 11/820,962, filed Jun. 21, 2007, PMR with Improved Writability and Process Controllability by Double Layer Patterning, assigned to the same assignee as the present invention, Lee et al.

* cited by examiner

*Primary Examiner* — Craig A. Renner
(74) *Attorney, Agent, or Firm* — Saile Ackerman LLC; Stephen B. Ackerman

(57) ABSTRACT

A structure and a process for a perpendicular write pole that provides increased magnetic flux at the ABS is disclosed. This is accomplished by increasing the amount of write flux that originates above the write gap, without changing the pole taper at the ABS. Three embodiment of the invention are discussed.

4 Claims, 4 Drawing Sheets

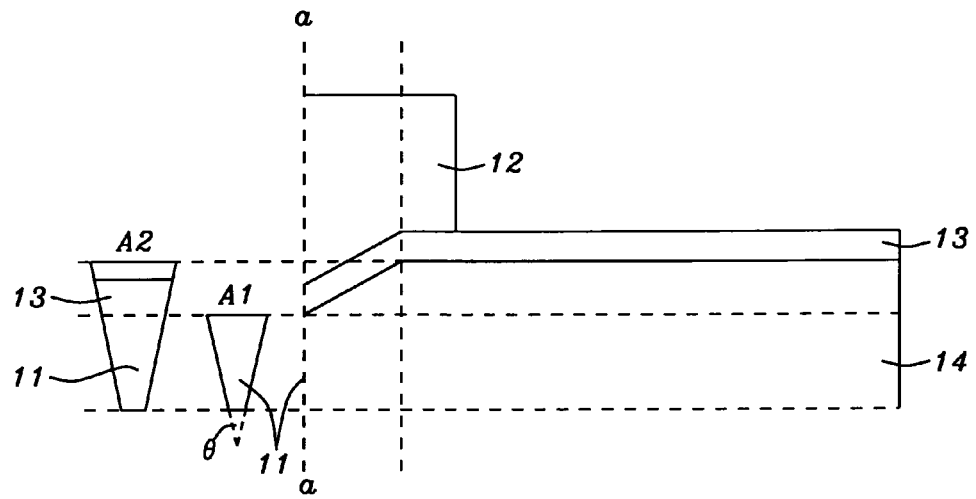
FIG. 1 – Prior Art
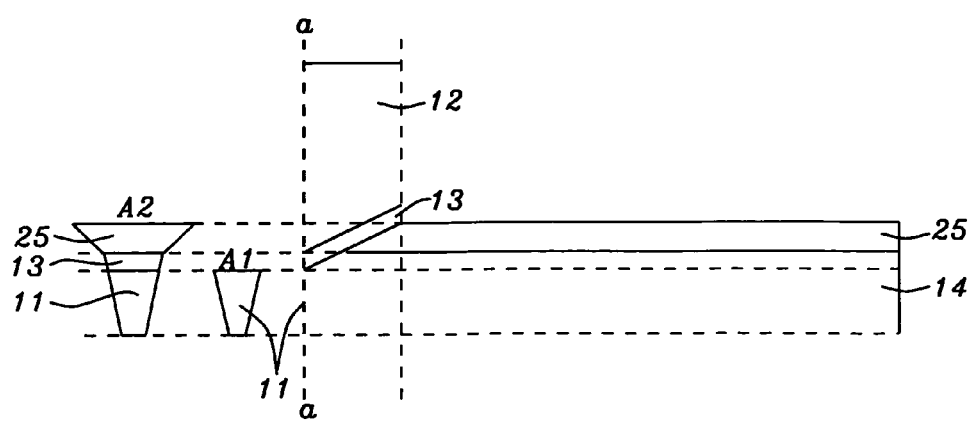
FIG. 2

GRADED BEVEL TAPERED WRITE POLE DESIGN FOR FIELD ENHANCEMENT

FIELD OF THE INVENTION

The invention relates to the general field of perpendicular magnetic writers with particular emphasis on delivering more flux to the ABS (air bearing surface).

BACKGROUND OF THE INVENTION

Tapered write gaps have been previously used to enhance field and field gradient, as shown in FIG. 1. It is based on the fundamental principle of increasing the choke area around the neck region so that the sides of ABS 11 are not quite parallel but, instead, converge at an angle θ thereby providing gradual flux concentration to bring additional field to the ABS. Because of the slope of the main pole, the area A2 behind the ABS is larger than the area A1 at the ABS. So a larger ratio of A2 to A1 corresponds to more flux concentration at the ABS. Other elements shown in FIG. 1 include trailing shield 12, write gap 13, and main pole 14.

As track widths narrow, still further enhancements are needed to this flux concentration approach. While steeper tapered write gap angles can increase A2/A1, the main drawbacks are the processing difficulty and too high a sensitivity of the ABS area A1 to the ABS lapping position 'aa'. If the taper angle θ is too large, a small displacement of ABS line 'aa', caused by the ABS lapping process, will result in a large change in both the ABS area and the physical width of the main pole. Therefore, methods for flux concentration are required that are not overly sensitive to changes in the angle at which the write gap lies relative to the ABS.

A routine search of the prior art was performed with the following references of interest being found:

In U.S. Pat. No. 6,621,659, Shukh et al. say "it is common to taper the pole from the larger width in the paddle region to a narrower width in the pole tip region at the ABS." However, the form of the taper is different from that disclosed by the present invention. U.S. Pat. No. 7,151,647 (Sasaki et al—Headway) shows a yoke portion having a wide portion, a narrow portion, and a sloping flare portion and U.S. Patent Application 2006/0044677 (Li et al—Headway) teaches a plated bevel pole design where the top is wider than the bottom.

U.S. Pat. No. 7,193,815 (Stoev et al) shows an upper section of the write shield wider than the lower section. U.S. Pat. No. 7,116,517 (He et al) teaches a T-shaped pole tip. U.S. Pat. No. 7,133,253 (Seagle et al) discloses a tapered pole tip while U.S. Pat. No. 6,680,815 (Sasaki) shows a tapered write gap as part of their FIG. 9

SUMMARY OF THE INVENTION

It has been an object of at least one embodiment of the present invention to provide a perpendicular write pole that provides increased magnetic flux at the ABS.

Another object of at least one embodiment of the present invention has been to provide a process for manufacturing said write pole.

Still another object of at least one embodiment of the present invention has been to achieve the above objects without increasing the degree of taper of the pole at the ABS.

A further object of at least one embodiment of the present invention has been to render performance of the completed device insensitive to small variations of the precise location of the ABS relative to other parts of the structure.

These objects have been achieved by increasing the amount of write flux that originates above the write gap without changing the pole taper at the ABS. In a first embodiment, this is achieved by increasing the taper of the section above the write gap. In a second embodiment, this section is extended so that it overlaps the write gap laterally. In a third embodiment, a part of this section is brought closer to the ABS while keeping the main parts of the write pole and the trailing shield well separated, magnetically speaking.

BRIEF DESCRIPTION OF THE DRAWINGS

FIG. 1 shows a tapered write pole of the prior art.
FIG. 2 shows a cross sectional view of the $1^{st}$ embodiment.

DESCRIPTION OF THE PREFERRED EMBODIMENTS

We describe below three embodiments of the invention, presented as processes for manufacturing the invention while also serving to describe the invented structure:

It should be noted that the descriptions that follow below, along with their drawings, are written as though the bodies described there, including in some cases cantilever-like projections, have no external support. In reality, these bodies are embedded in one or more layers of insulating material (typically $Al_2O_3$) which provide whatever mechanical support that is needed without influencing the performance of the device being portrayed. In the interests of simplifying both the descriptions and the figures, these supporting layers are not necessarily shown or mentioned.

FIG. 2 shows the first of the new configurations disclosed in the present invention to enhance flux concentration ratio A2/A1 while still keeping the taper angle of the write gap unchanged. Compared to the prior art shown in FIG. 1, main pole 14 taper is now formed from two layers, 14 and 25.

Figure 7:
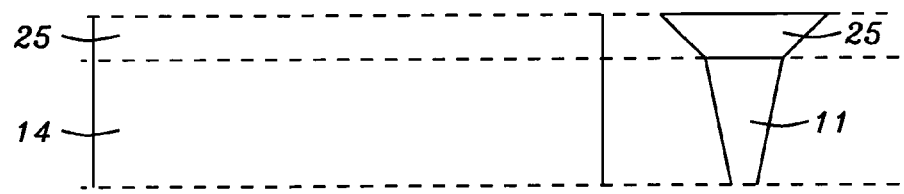
FIGS. 7-8 show process steps to make the $1^{st}$ and 2nd embodiments respectively.

To form layer 14, a first trench, with sidewalls that slope at an angle θ to the vertical, is formed in a layer of insulation (not shown) to a first depth. This trench is now just filled (overfill followed by CMP) with a layer of material suitable for the main pole followed by a non-magnetic layer (for the write gap). The (filled) first trench is then covered with a second layer of insulation (also not shown). A second trench, whose floor is aligned with the roof of the first trench, is now formed in the second insulation layer, said second trench having sidewalls that slope at an angle greater than θ. The second trench is then just filled with the same material as the first trench, thereby forming layer 25 and completing formation of element 14 as seen in FIG. 7.

This is followed by an angle-lapping step to form the appropriately sloped surface onto which non-magnetic write gap layer 13 is then deposited (as well as being simultaneously deposited onto the top surface of lower pole 14). The process concludes with the deposition and shaping of trailing shield 12.

Thus top part 25 of layer 14 has a larger taper angle than bottom part 11, which increases A2 relative to A1 without increasing the sensitivity of the ABS to the lapping angle. This is because, after tapered write gap 13 is formed, top layer 25 will be recessed from ABS 11 so that the larger taper angle will not change A1 when ABS line 'aa' is moved.

Figure 3:
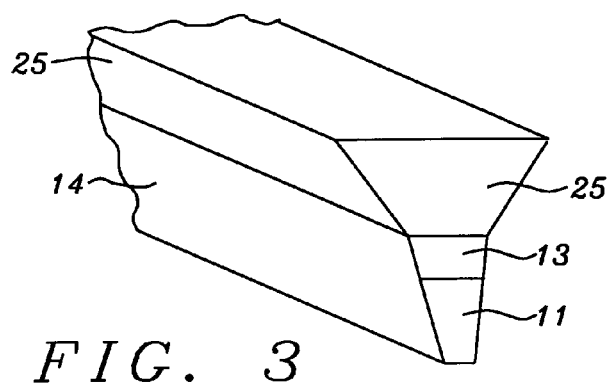
FIG. 3 shows a 3D view of the $1^{st}$ embodiment.

FIG. 3 shows a 3D view of the structure after tapered write gap 13 has been formed.

Figure 4:
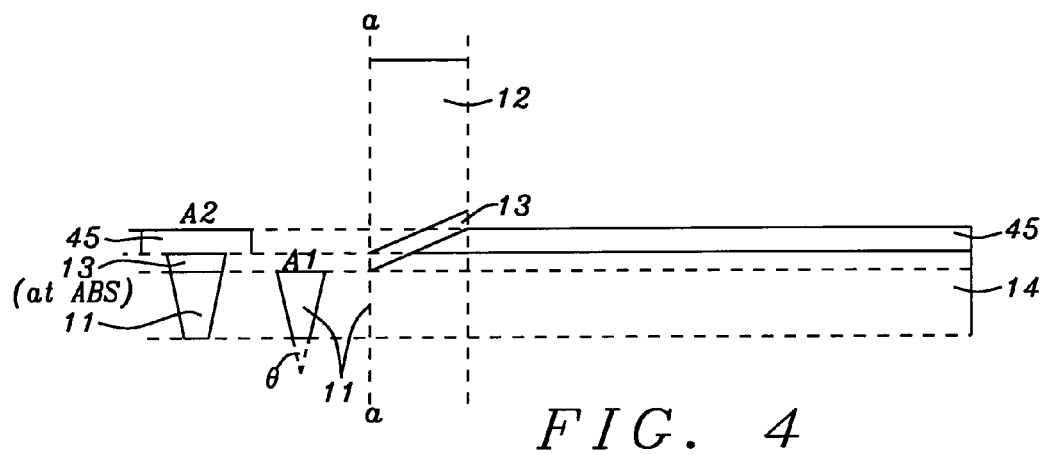
FIG. 4 shows a cross sectional view of the $2^{nd}$ embodiment.
Figure 5:
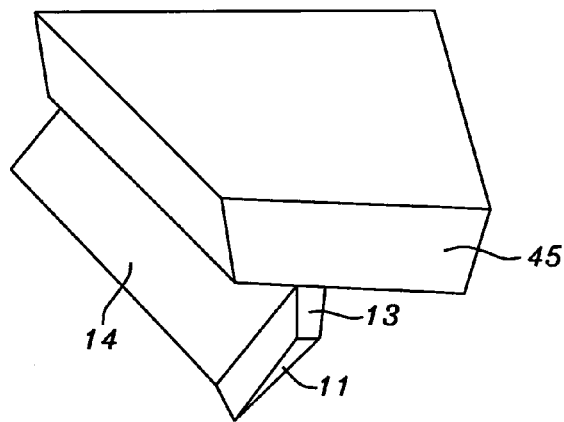
FIG. 5 shows a 3D view of the $2^{nd}$ embodiment.

FIG. 4 (cross sectional view) and FIG. 5 (3D view of FIG. 4) show the $2^{nd}$ embodiment of the invention. It differs from the $1^{st}$ embodiment in that newly added top layer 45 is not simply an extension of bottom layer 14 with a larger taper angle. Instead, layer 45 does not need to be tapered (although using a tapered shape here would still be within the scope of the invention) In FIGS. 4 and 5 we show element 45 as having a rectangular cross-section (our preferred shape) but as long as there is a net increase in the A2/A1 ratio, the objects of the invention will have been met. In general, element 45 will be wider than the top of write gap 13 enabling the achievement of a larger A2/A1.

Figure 8:
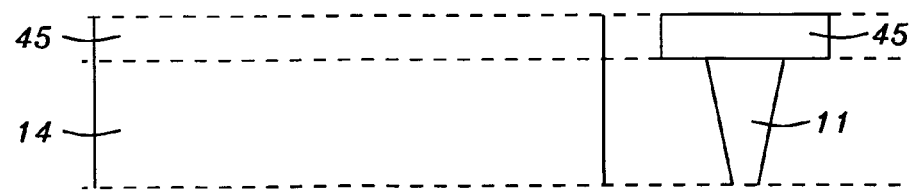

Process-wise the main departure from the first embodiment is that the second trench, also aligned with the first trench and also formed in the second insulation layer, extends outwards from the mouth of the first trench (typically up to about 0.2 to 0.5 microns in each direction) and has straight, as opposed to sloping, sides. As for the first embodiment, the second trench is then just filled with the same material as before, thereby completing formation of element 14 as illustrated in FIG. 8.

Figure 6:
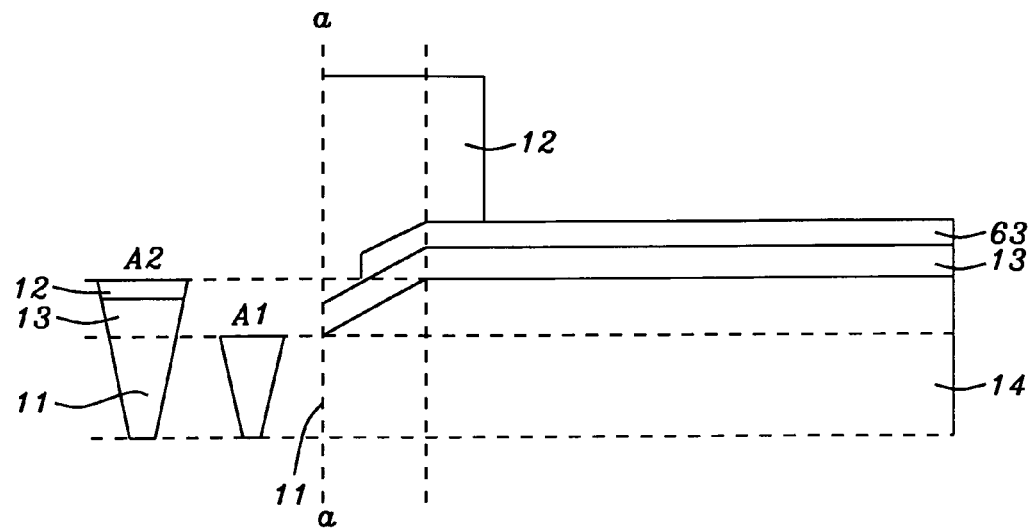
FIG. 6 shows a cross sectional view of the $3^{rd}$ embodiment.
Figure 9:
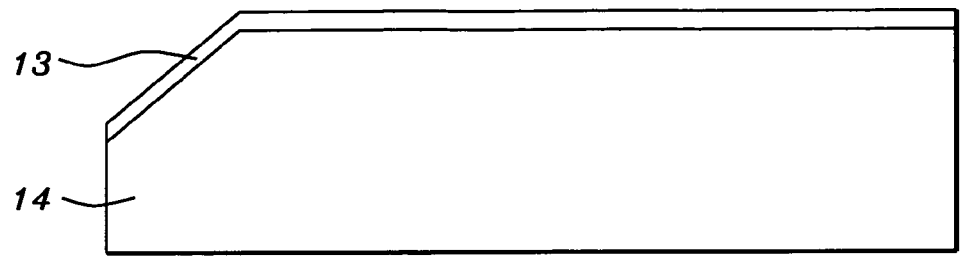
FIG. 9 shows the starting point for manufacturing the $3^{rd}$ embodiment.

The $3^{rd}$ embodiment takes a different approach from the previous two embodiments. Instead of changing the A2/A1 ratio, a non-uniform write gap is formed. This is illustrated FIG. 6 which shows that extra non-magnetic layer 63 has been inserted between write pole 14 and trailing shield 12. Thus, the write gap is narrower at the ABS and wider away from it. This reduces flux leakage from the main pole to the write shield. Consequently, for a given A2/A1, this larger separation of the main pole from the trailing shield results in more flux being delivered at the ABS, while the field gradient is unchanged since the write gap at the ABS is unchanged. FIG. 9 shows how non-magnetic layer 13 (the write gap layer) is made up of two connected parts, both of which lie on the upper surface of element 14—a sloping part (on the left of the figure) and a level part (on the right).

Figure 10:
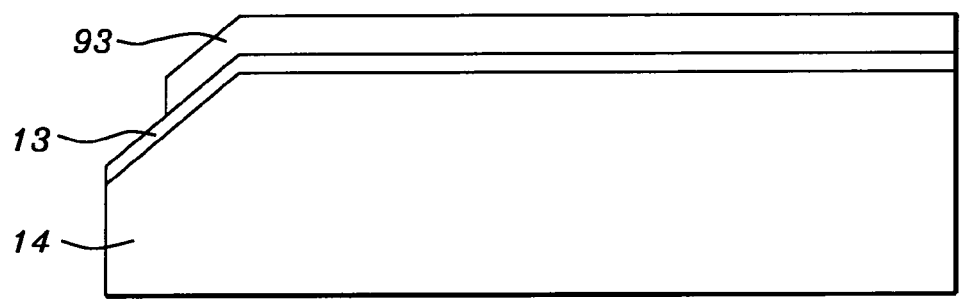
FIGS. 10 and 11 show additional steps in the manufacture of the $3^{rd}$ embodiment.
Figure 11:
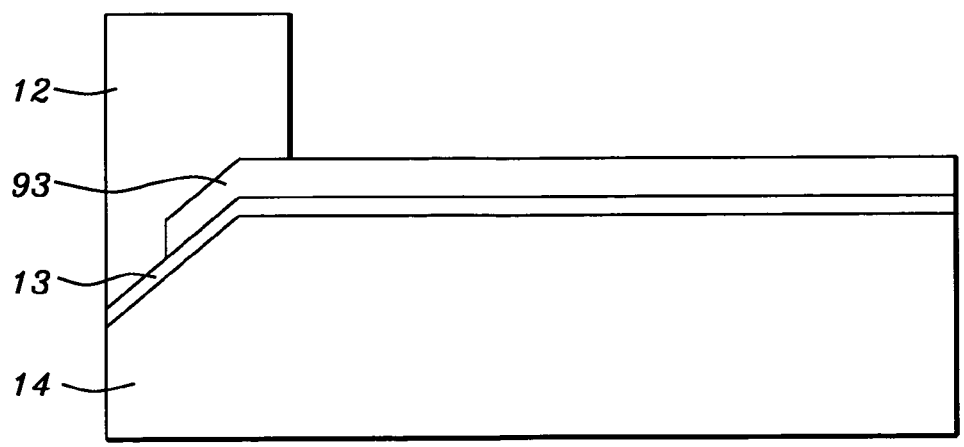

The starting point for forming a write pole built according to the teachings of the third embodiment is similar to the point where, in the first two embodiments, layer 14 has been angle-lapped to provide a suitably tilted surface for layer 13. After deposition of non-magnetic layer 13, as seen in FIG. 10, the non-uniform write gap can be formed by depositing $2^{nd}$ write gap layer 93 which is then patterned so that it terminates at a distance (typically between about 0.05 and 0.2 microns from the ABS. The process ends with the deposition and patterning pf layer 12 to form the trailing shield, as shown in FIG. 11.

What is claimed is:

1. A perpendicular magnetic write pole for magnetic recording, having a planar air bearing surface (ABS) at a distal end, comprising:

a bottom magnetic layer, having a first planar upper surface and a first planar edge that is normal to said first planar upper surface and that is part of and coplanar with the ABS plane;

a top magnetic layer formed on said bottom magnetic layer, said top magnetic layer having a second planar upper surface and a first planar lower surface that is parallel to said second planar upper surface and that contiguously contacts said first planar upper surface of said bottom magnetic layer; and a sloping planar surface that intersects both said top magnetic layer and said bottom magnetic layer and forms a bevel thereon, said sloping planar surface making parallel transverse lines of intersection with said first planar upper surface, said second planar upper surface and said ABS plane and said lines of intersection, with the exception of said line intersecting said ABS plane, being proximally displaced from said ABS plane;

a write gap in the form of a single non-magnetic layer that lies on and is contiguous with said planar sloping surface, said single non-magnetic layer having a third planar edge that emerges at and is coplanar with said first edge and thereby forms a part of said ABS plane;

said non-magnetic layer having a slope angle of said sloping planar surface of between about 10 and 45 degrees as measured by an angle between said sloping planar surface and a plane parallel to said first upper surface of said bottom magnetic layer;

wherein a planar cross-section, in a plane parallel to said ABS plane, through said top and said bottom magnetic layers at a position proximal to the line of intersection of said sloping planar surface with said second upper surface of said top magnetic layer, has the shape of two abutting trapezoids, a lower trapezoid corresponding to a cross-sectional shape of said lower magnetic layer and having a first maximum width, whose non-parallel sides converge, at a first taper angle; and an upper trapezoid, corresponding to a cross-sectional shape of said upper magnetic layer and a maximum width that exceeds said first maximum width and non-parallel sides that converge at a second taper angle that is larger than said first taper angle, and wherein, in said ABS plane, said cross-sectional shape includes said bottom magnetic layer and said non-magnetic gap above it and is a single trapezoid, including a portion of said lower trapezoid that is shortened by an intersection with said sloping surface;

whereby the narrowing of the taper angles from said upper magnetic layer to said lower magnetic layer and the shortening of only the lower trapezoid in the distal direction, while not affecting the upper trapezoid causes additional flux to be directed to the ABS without the need to increase said first taper angle.

2. The perpendicular magnetic write pole described in claim 1 wherein said bottom magnetic layer has a thickness in the range of from 0.2 to 0.4 microns.

3. The perpendicular magnetic write pole described in claim 1 wherein said non-magnetic layer has a thickness in the range of from 0.05 to 0.2 microns.

4. The perpendicular magnetic write pole described in claim 1 wherein said non-magnetic layer is selected from the group consisting of $Al_2O_3$, $SiO_2$, and all non-magnetic metals.

* * * * *